Feb. 3, 1970  H. Y. JULIUSBURGER  3,493,928
ELECTRONIC KEYBOARD TERMINAL CODE CHECKING SYSTEM
Filed July 12, 1966  7 Sheets-Sheet 4
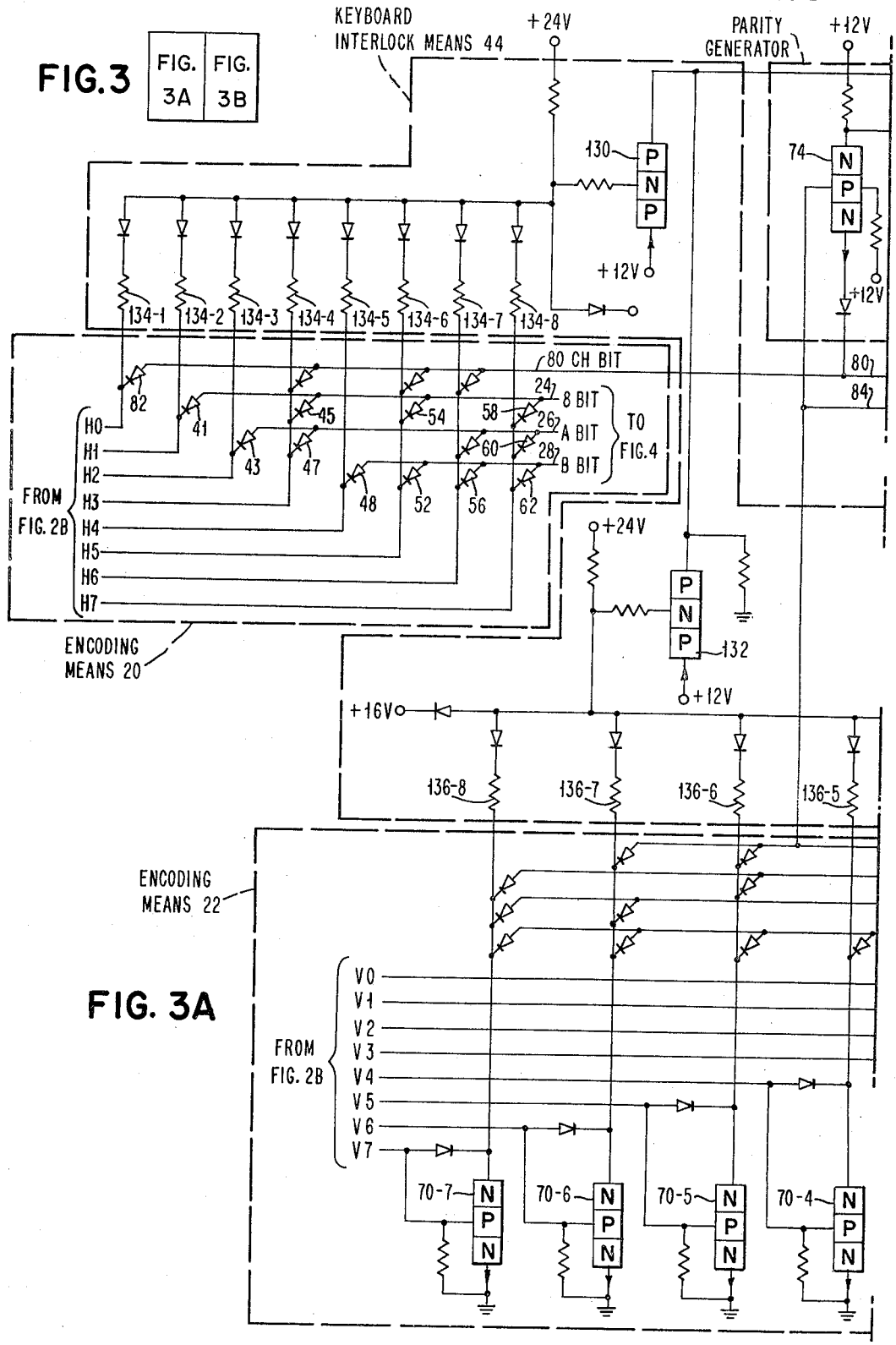

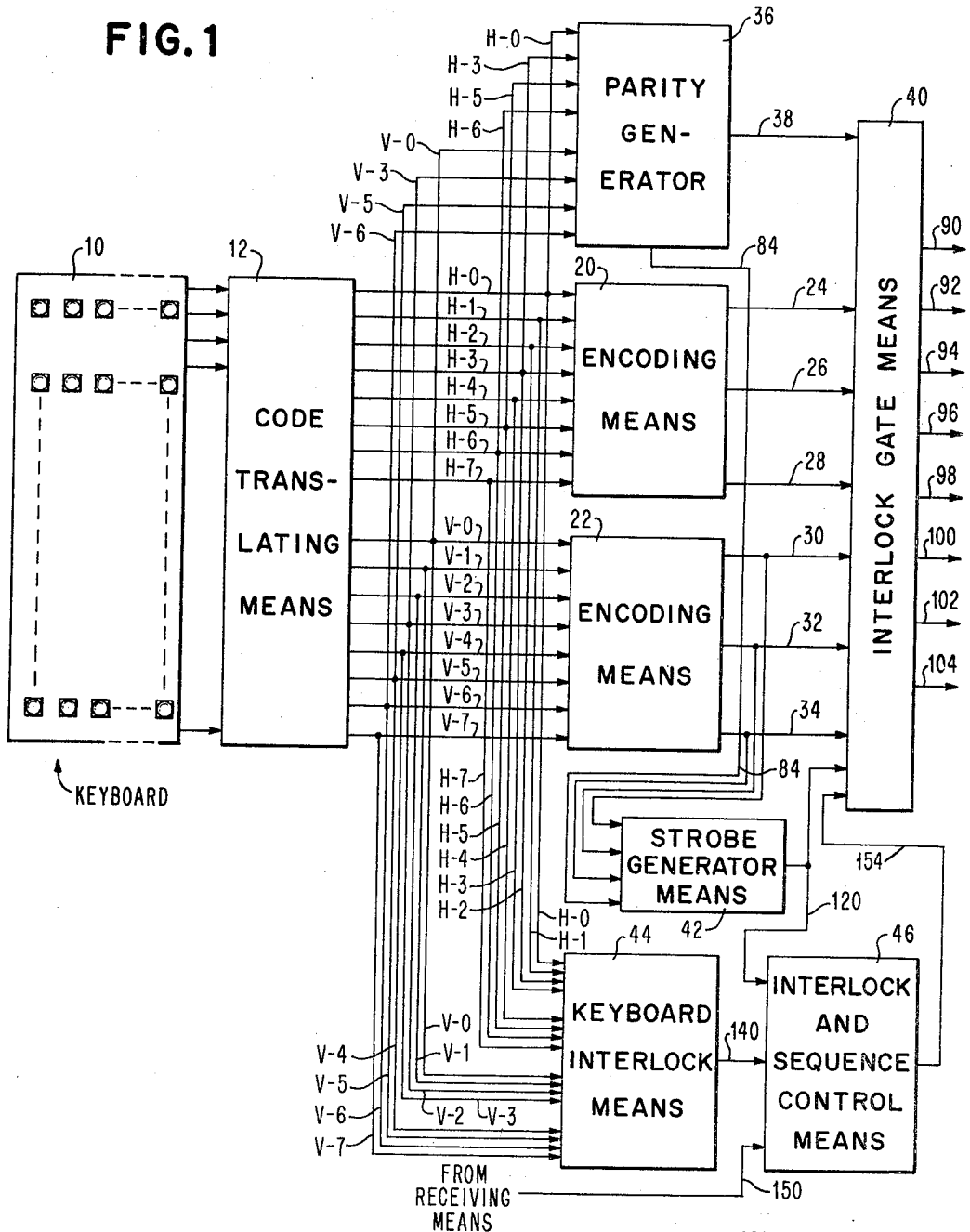

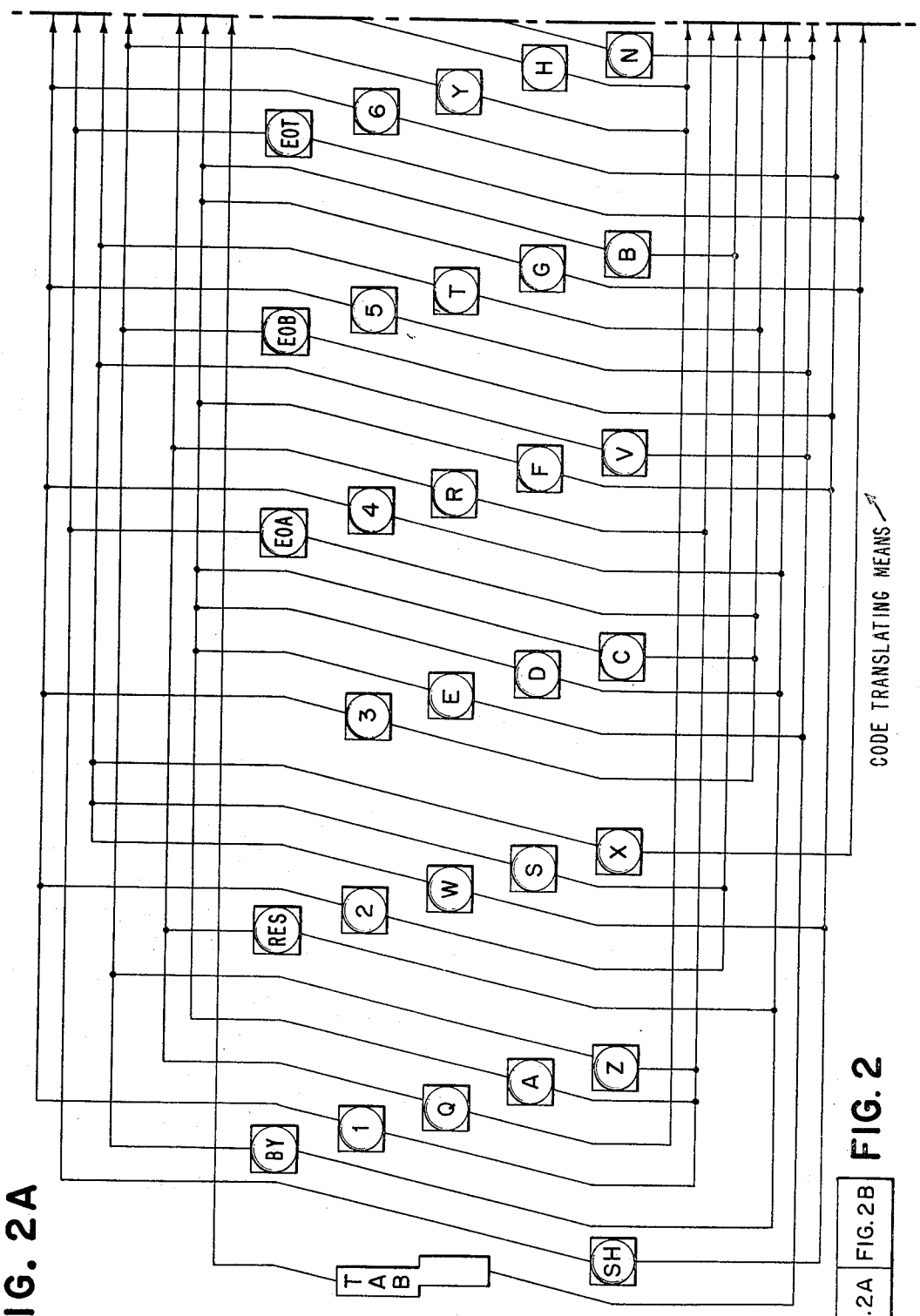

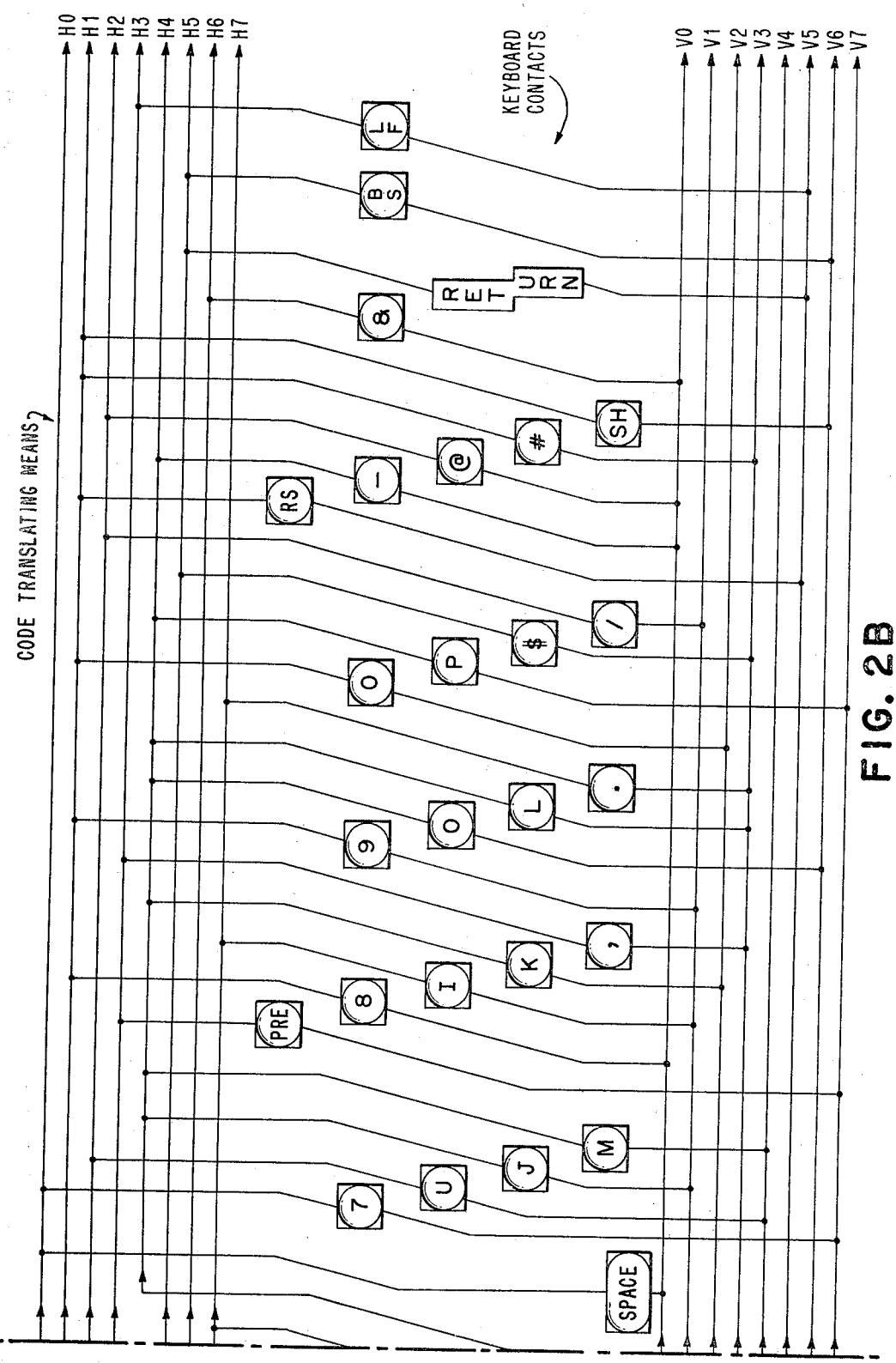

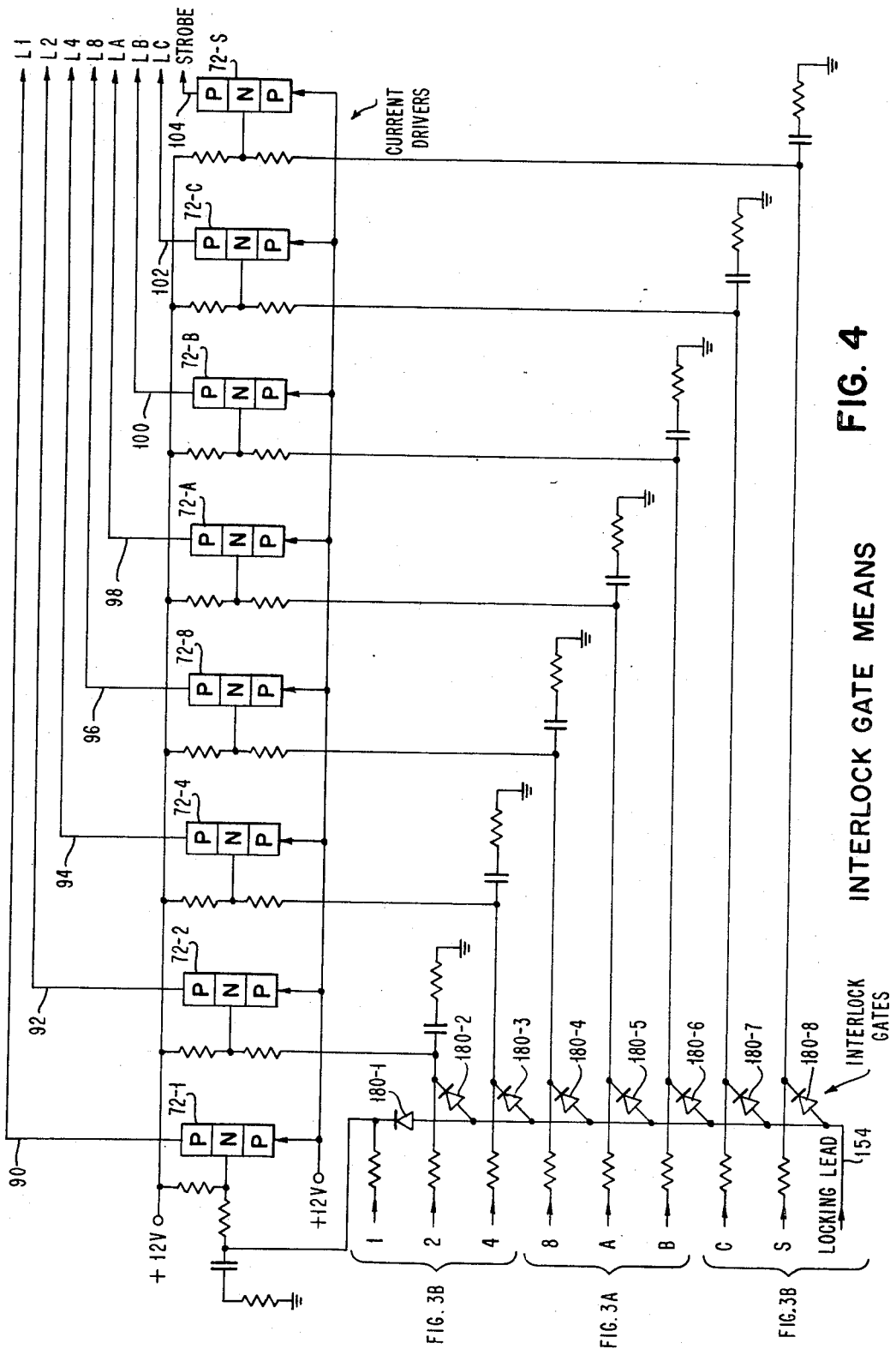

United States Patent Office 3,493,928
Patented Feb. 3, 1970

3,493,928
ELECTRONIC KEYBOARD TERMINAL CODE CHECKING SYSTEM
Hans Y. Juliusburger, Putnam Valley, N.Y., assignor to International Business Machines Corporation, Armonk, N.Y., a corporation of New York
Filed July 12, 1966, Ser. No. 564,604
Int. Cl. G08b 29/00; G06f 11/00; H04l 3/00
U.S. Cl. 340—146.1                                8 Claims

ABSTRACT OF THE DISCLOSURE

An elastomeric keyboard terminal includes keys which, when depressed, connect unique pairs of leads, one selected from each of two groups of eight leads. The key selection is then converted into the BCD (binary-coded decimal) code by encoders and odd parity is added by a parity generator. A strobe pulse is generated upon key depression by a strobe generator. If two keys are inadvertently simultaneously depressed, a keyboard interlock circuit causes the output signal to be inhibited.

---

The present invention relates to keyboards and more particularly to a nonmechanical keyboard composed entirely of electronic components. Keyboards, that is a plurality or array of keys which may be manually depressed, have proven through the years to be extremely useful in all areas where a human operator is to enter information into a system. Keyboards are employed in typewriters, stenotype machines, keypunch machines, computer input devices, telephones and a large variety of other equipment. Practically all presently existing keyboards are either mechanical or electromechanical and as such include such drawbacks as weight, bulk, wear of mechanically moving parts which require maintenance and repair and other problems associated with mechanical systems.

It is an object therefore of the present invention to provide an electronic keyboard terminal having no mechanical parts.

A further object of the present invention is to provide a keyboard wherein the key assignments can be readily varied by changing electrical contacts, for example, by substitution of printed circuit cards.

Still another object of the present invention is to provide an electronic keyboard terminal wherein key depression produces coded electronic signals including parity bits.

Still another object of the present invention is to provide an electronic keyboard including a keyboard interlock feature which indicates whenever more than one key has been simultaneously depressed.

A still further object of the present invention is to provide an electronic keyboard terminal having all required interlock controls to enable operation as a computer input terminal.

The foregoing and other objects, features and advantages of the invention will be apparent from the following more particular description of a preferred embodiment of the invention, as illustrated in the accompanying drawings.

In the drawings:
FIG. 1 is a schematic block diagram of an embodiment of an electronic keyboard terminal according to the principles of the present invention.

FIG. 2 illustrates how FIG. 2A and FIG. 2B are combined.

FIG. 2A and FIG. 2B combined illustrate a schematic circuit diagram of a keyboard circuit and a code translating unit for the system of FIG. 1.

FIG. 3 illustrates how FIG. 3A and FIG. 3B are combined.

FIG. 3A and FIG. 3B combined illustrate a schematic circuit diagram of encoding units and other component circuits of the system of FIG. 1.

FIG. 4 illustrates a schematic circuit diagram of current drivers and interlock gates used in the system of FIG. 1.

Figure 3B:
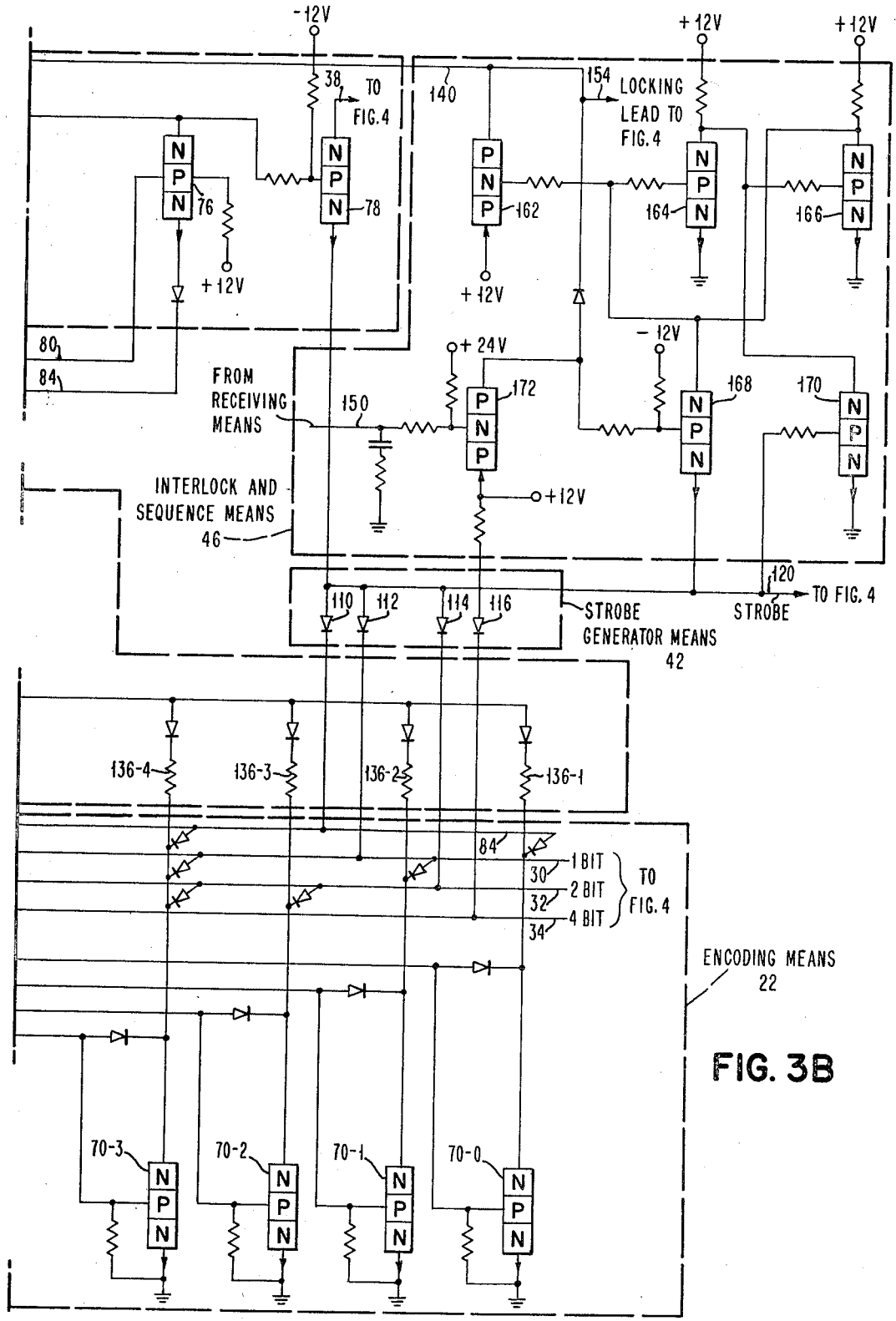

Referring to FIG. 1, a schematic block diagram of an embodiment of the electronic keyboard terminal is shown including keyboard unit 10. The embodiment produces coded output signals and may be used as a transmitter or as a computer input terminal. Keyboard unit 10 is basically an elastomeric diaphragm switch whose contacts are actuated by the depression of the key units. When a key is depressed, an electrical contact is closed and a complete electric circuit path is established on a pair of wires associated with the key. As will be shown in more detail later, the keyboard contains fifty-eight keys. When any key is depressed, it becomes a one out of fifty-eight selection. The keyboard is connected to a first code translating means 12 which converts the key depressions into a two of sixteen code. It was previously stated that the depression of any key on a keyboard causes an electrical connection to be made between a combination of two leads unique to that key. The code translating means 12 consists of a matrix arrangement wherein the one of fifty-eight selection made on the keyboard is translated to a two of sixteen output lead arrangement, that is, there are two groups of eight leads each (a total of sixteen leads labeled H–0 through H–7 and V–0 through V–7) associated with the code translating means 12. The pair of wires associated with each key of keyboard 10 (a total of one hundred and sixteen leads) are each connected to one lead of each group of eight leads H–0 through H–7 and V–0 through V–7 of code translating means 12. The depression of a key on the keyboard unit 10 therefore connects a selected one of the first group of eight leads with a selected one of the second group of eight leads. Thus, the key selection is now in the form of a two of sixteen code with one of the first group of eight output leads from code translating means 12 (leads H–0 through H–7) being connected to one of the second group of eight output leads (leads V–0 through V–7) from the code translating means 12.

It is now desired that the two out of sixteen code be translated to the well-known binary coded decimal (BCD) code. To accomplish this the first group of eight output leads from the code translating means (leads H–0 through H–7) is connected to a first encoding unit 20 and the other eight output leads from the first code translating means (leads V–0 through V–7) are connected to a second encoding unit 22. The BCD code consists of six code elements known as 1 bit, 2 bit, 4 bit, 8 bit, A bit and B bit. The first encoding means 20 has three output leads, the 8 bit lead 24, the A bit lead 26 and the B bit lead 28. The second encoding means 22 also has three output leads, the 1 bit lead 30, the 2 bit lead 32 and the 4 bit lead 34. A parity generating means 36 is also provided which is responsive to the output from the code translating means 12 and provides an odd parity check for the BCD code. The parity bit lead 38 from the parity generating means 36 is referred to as the C bit lead. The three output leads 24, 26 and 28 from the first encoding means 20 and the three output leads 30, 32 and 34 from the second encoding means 22 and the C bit lead 38 from the parity generating means 36 are applied to interlock gate means 40. Three additional functional elements shown in FIG. 1 are strobe bit generating means 42, the keyboard interlock means 44 and interlock and sequence control means 46. The strobe bit generating means 42 is connected to the second encoding means 22 and produces a strobe bit on lead 120 which is connected to the interlock gate means 40. The strobe bit indicates that a character has been generated as a result of a key depression. The strobe bit on lead 120 is also connected to the parity generating means to contribute to proper parity generation. The keyboard interlock circuit means 44 is connected to the code translating means 12 and produces an output signal whenever two or more keys have been simultaneously depressed. The interlock and sequence control means 46 is connected to the output of the keyboard interlock circuit means 44 and the strobe bit generator means 42 and produces a keyboard lock signal if multiple key depression occurs.

The keyboard unit employed in the present system is of the type referred to as an elastomeric keyboard and is described in copending U.S. patent application, Ser. No. 442,758, filed Mar. 25, 1965 now U.S. Patent No. 3,308,253 issued Mar. 7, 1967 by M. Krakinowski and assigned to the present assignee. An elastomeric switch or keyboard consists of a first layer containing a plurality of conductors on its upper side, upon which is mounted an insulating apertured plate. Over the insulating apertured plate an elastic or deformable layer is mounted which also contains a plurality of conductors on its lower side. By manually depressing a portion of the upper elastic layer into contact with the lower layer through an aperture in the plate, a pair of upper and lower conductors are brought into physical (and electrical) contact. When the manual pressure is removed, the upper elastic layer returns to its original state, the conductors separate and the electrical contact is broken. In the present embodiment the elastomeric switch consists of fifty-eight pairs of contacts which may be actuated through apertures arranged in a keyboard pattern. Mounted on top of the elastic layer and positioned over each of the apertures is provided a key and stem such that there are a total of fifty-eight keys. If necessary, a total of sixty-four keys could be provided in the present embodiment.

Referring to FIGS. 2A and 2B combined, a layout is shown of keyboard 10. The individual keys are represented by their associated characters. For purposes of explanation, the keys can be considered switches which, when closed by depression, electrically connect the two vertical conductors associated therewith. There being fifty-eight keys, there are, therefore, a total of fifty-eight conductors on the upper side of the key array and a total of fifty-eight conductors on the lower side of the key array. The fifty-eight conductors on the upper portion of FIGS. 2A and 2B are selectively connected to eight leads designated H–0 through H–7. Likewise, the fifty-eight conductors connected to the keys and shown in the lower portion of FIGS. 2A and 2B are selectively connected to the eight leads designated V–0 through V–7. The connections between the conductors associated with the keyboard keys and the two groups of eight conductors H–0 through H–7 and V–0 through V–7 form a functional unit which is the code translating means 12 which converts the one of fifty-eight key depression to a two of sixteen code. Thus, the depression of the key designated W, which is a one of fifty-eight selection, electrically connects lead H–2 to lead V–6. Similarly, a depression of each of the remaining keys of the keyboard will result in a unique connection of one lead from the group H–0 through H–7 with one lead from the group V–0 through V–7. The following Table I lists in columnar form each of the keys of the keyboard 10 and in the next column sets forth the pairs of leads which are electrically connected by the depression of such key.

An advantage of keyboard 10 is that the key assignments may be varied by merely changing the connections to leads H–0 through H–7 and V–0 through V–7. This may be readily accomplished by substituting printed circuit connections.

Referring again to FIG. 1, it is seen that the output leads H–0 through H–7 from code translating means 12 are connected to a first encoding means 20 and leads V–0 through V–7 from code translating means 12 are connected to second encoding means 22.

Referring to FIGS. 3A and 3B the encoding means 20 and 22 are shown. The purpose of the encoding means 20 and 22 is to convert the signals on leads H–0 through H–7 and V–0 through V–7 into the binary coded decimal type code associated with the character of the key depressed on keyboard 10. The binary coded decimal code referred to as the BCD code is well known. The BCD code consists of code elements or bits labeled 1, 2, 4, 8, A and B. Combinations of the code bits 1, 2, 4, 8, A and B represent alpha-numeric characters. The commonly known relationship between alpha-numeric characters and the BCD code bits are set forth in Table I. Thus, the numeral 1 is represented by bit 1 in the BCD code, numeral 2 is represented by bit 2, numeral 3 is represented by bit 1 and bit 2, the character A is represented by bit 1, bit A and bit B, the character B is represented by bit 2, bit A and bit B and so forth through Table I for the remaining alpha-numeric characters and the special keyboard symbols. Referring to FIGS. 3A and 3B, encoding means 20 is connected to the leads H–0 through H–7 and encoding means 22 is connected to the leads V–0 through V–7.

TABLE I

| Key | Lead Connections | | BCD Code | | | | | | Parity | |
|---|---|---|---|---|---|---|---|---|---|---|
| | V | H | 1 | 2 | 4 | 8 | A | B | CV | CH |
| 1 | V-1 | H-0 | X | | | | | | | X |
| 2 | V-2 | H-0 | | X | | | | | | X |
| 3 | V-3 | H-0 | X | X | | | | | X | X |
| 4 | V-4 | H-0 | | | X | | | | | X |
| 5 | V-5 | H-0 | X | | X | | | | X | X |
| 6 | V-6 | H-0 | | X | X | | | | X | X |
| 7 | V-7 | H-0 | X | X | X | | | | | X |
| 8 | V-0 | H-1 | | | | X | | | X | |
| 9 | V-1 | H-1 | X | | | X | | | | |
| 0 | V-2 | H-1 | | X | | X | | | | |
| A | V-1 | H-6 | X | | | | X | X | | X |
| B | V-2 | H-6 | | X | | | X | X | | X |
| C | V-3 | H-6 | X | X | | | X | X | X | X |
| D | V-4 | H-6 | | | X | | X | X | | X |
| E | V-5 | H-6 | X | | X | | X | X | X | X |
| F | V-6 | H-6 | | X | X | | X | X | X | X |
| G | V-7 | H-6 | X | X | X | | X | X | | X |
| H | V-0 | H-7 | | | | X | X | X | X | X |
| I | V-1 | H-7 | X | | | X | X | X | | |
| J | V-1 | H-4 | X | | | | X | | | |
| K | V-2 | H-4 | | X | | | X | | | |
| L | V-3 | H-4 | X | X | | | X | | X | |
| M | V-4 | H-4 | | | X | | X | | | |
| N | V-5 | H-4 | X | | X | | X | | X | |
| O | V-6 | H-4 | | X | X | | X | | | |
| P | V-7 | H-4 | X | X | X | | X | | | |
| Q | V-0 | H-5 | | | | X | X | | X | X |
| R | V-1 | H-5 | X | | | X | X | | | X |
| S | V-2 | H-2 | | X | | | | X | | |
| T | V-3 | H-2 | X | X | | | | X | X | |
| U | V-4 | H-2 | | | X | | | X | | |
| V | V-5 | H-2 | X | | X | | | X | X | |
| W | V-6 | H-2 | | X | X | | | X | | |
| X | V-7 | H-2 | X | X | X | | | X | | |
| Y | V-0 | H-3 | | | | X | | X | X | X |
| Z | V-1 | H-3 | X | | | X | | X | | X |
| TAB | V-5 | H-7 | X | | X | X | X | X | X | |
| SH | V-6 | H-1 | | X | X | X | | | | X |
| BY | V-4 | H-3 | | | X | X | | X | | |
| RES | V-4 | H-5 | | | X | X | X | | X | X |
| EOA | V-3 | H-1 | X | X | | X | | | | X |
| EOB | V-6 | H-3 | | X | X | X | | X | | X |
| EOT | V-7 | H-1 | X | X | X | X | | | | |
| SPACE | V-0 | H-0 | | | | | | | X | X |
| PRE | V-7 | H-3 | X | X | X | X | | X | | X |
| , | V-3 | H-3 | X | X | | X | | X | X | X |
| ; | V-3 | H-7 | X | X | | X | X | X | | |
| / | V-1 | H-2 | X | | | | | X | | |
| RS | V-5 | H-1 | X | | X | X | | | X | |
| - | V-0 | H-4 | | | | | X | | | X |
| @ | V-0 | H-2 | | | | | | X | X | X |
| # | V-3 | H-1 | X | X | | X | | | | X |
| & | V-0 | H-6 | | | | | X | X | X | X |
| SH | V-6 | H-1 | | X | X | X | | | | X |
| RETURN | V-5 | H-5 | X | | X | X | X | | X | X |
| BJ | V-6 | H-5 | | X | X | X | X | | X | X |
| LF | V-5 | H-3 | X | | X | X | | X | | X |
| $ | V-3 | H-5 | X | X | | X | | X | X | X |

Encoding means 20 produces three output leads, these leads being the 8 bit lead 24, the A bit lead 26, and the B bit lead 28 of the BCD code and encoding means 22 has three output leads 30, 32 and 34, these leads being respectively associated with the 1 bit, 2 bit and 4 bit elements of the BCD code. What is desired is that, for example, when the A key of keyboard 10 is depressed, signals will be produced on the 1 bit lead 30 from encoding means 22 and the A bit and the B bit leads 26 and 28 from encoding means 20, thus representing the character A in the BCD code as set forth in Table I. In actual operation the presence of a BCD bit will be manifested by a grounded condition on its associated lead. Thus when an A bit is present, a grounded condition will be present on lead 26, and an A bit signal from encoding means 20 will mean a ground potential.

As shown in FIGS. 3A and 3B, lead H–1 of encoding means 20 is connected via a diode 41 to the 8 bit output lead 24. Likewise, lead H–2 is connected via diode 43 to the A bit lead 26, lead H–3 is connected via diode 45 to the 8 bit lead 24 and via diode 47 to the A bit lead 26, lead H–4 is connected via diode 48 to the B bit lead 28, lead H–5 is connected via diode 50 to the 8 bit lead 24 and via diode 52 to the B bit lead 28, lead H–6 is connected via diode 54 to the A bit lead 26 and via diode 56 to the B bit lead 28, and lead H–7 is connected via diode 58 to the 8 bit lead 24 via diode 60 to the A bit lead 26 and via diode 62 to the B bit lead 28. Likewise, by similar diode connections, in encoding means 22 the V–1 lead is connected to the 1 bit lead 30, the V–2 lead is connected to the 2 bit lead 32, the V–3 lead is connected to the 1 bit and the 2 bit leads 30 and 32, the V–4 lead is connected to the 4 bit lead 34, the V–5 lead is connected to the 1 bit and 4 bit leads 30 and 34, the V–6 lead is connected to the 2 bit and 4 bit leads 32 and 34, and the V–7 lead is connected to the 1 bit, 2 bit and 4 bit leads 30, 32 and 34. The leads V–0 through V–7 in encoder means 22 are also each connected to a separate one of transistor circuits 70–0 through 70–7, respectively.

In FIGS. 3A and 3B the parity generator 36 is shown consisting of transistors 74, 76 and 78. The parity generator produces a C parity bit on lead 38 when the total number of BCD bits produced by a character is an even number. The addition of the C parity bit to the even number of BCD bits makes the total number of bits to be an odd number and therefore this is referred to as odd parity. The generation of the C parity bit is actually dependent on the presence or absence of two other parity bits associated with the H–0 through H–7 lines and V–0 through V–7 lines which will be referred to as the CH parity bit and the CV parity bit, respectively. The CH bit is produced when the number of bits from encoding means 20 is even and the CV bit is produced when the number of bits from encoding means 22 is even. Thus, the CH bit is an odd parity bit for encoding means 20 and the CV bit is an odd parity bit for the encoding means 22. In FIGS. 3A and 3B when there is a connection made to one or three (odd number) of the leads 24, 26 and 28, the CH bit is not needed, but if connections are made on zero or two (even number) of the leads 24, 26 and 28, then the CH bit is required. The CH bit will appear on lead 80 from encoding means 20. A zero bit condition from leads 24, 26 and 28 occurs when a signal is present on lead H–0, therefore lead H–0 is connected to lead 80 via diode 82 to produce a CH bit. When a signal is present on lead H–1, an odd output, that is, a single bit on lead 24, is produced from encoding means 20 and no CH bit is necessary. It can be seen by tracing the remainder of the leads H–2 through H–7 that even bit conditions will occur when a signal is present on lead H–3, or H–5 or H–6. Therefore these leads are also connected by diodes to lead 80 to produce a CH bit when a signal is present thereon. In the same manner a CV bit lead 84 is included in encoding means 22 and leads V–0, V–3, V–5 and V–6 are connected to lead 84 via diodes to produce a CV bit when a signal is present on any of those such leads. Referring back to Table I, the columns CV and CH will illustrate when the CV bit and the CH bit are produced. For example, the BCD code for character A is the presence of a 1 bit, an A bit and a B bit. Only the 1 bit is produced by encoding means 22 and the output being odd, no CV bit is required. The A bit and the B bit are produced by encoding means 20 and the output being even (two), a CH bit is required. The conditions for producing the CH bit and the CV bit and the C bit are tabulated in the following Table II.

TABLE II

| Encoding means 20 bit | Encoding means 22 bit | CH | CV | Total bits | C bit Required |
|---|---|---|---|---|---|
| Odd | Odd | Off | Off | Even | Yes. |
| Odd | Even | Off | On | Odd | No. |
| Even | Odd | On | Off | Odd | No. |
| Even | Even | On | On | Even | Yes. |

From Table II it is seen that the total BCD code will be odd when the output from encoding means 20 is odd and the output from encoding means 22 is even or vice versa. If the output from encoding means 20 and 22 are both odd, or both even, the total BCD code will be even and a C parity bit is required on lead 38. When the output from encoding means 20 and 22 are both odd, the CH and the CV bits are both absent and when the output from encoding means 20 and 22 are both even, the CH and the CV bits are both present. Thus, the absence of both the CH and the CV bits or the presence of both the CH and the CV bits at the same time indicates that a C parity bit is required, but if the CH bit or the CV bit is present and the other is absent, then no C parity is required.

To carry out this operation an inverted EXCLUSIVE OR function is required. This is accomplished by transistors 74, 76 and 78 in FIGS. 3A and 3B. The CH lead 80 is connected to the emitter of transistor 74 and the base of transistor 76 and the CV lead 84 is connected to the emitter of transistor 76 and the base of transistor 74. The collectors of transistors 74 and 76 are connected to a +12 volt potential source and to the base of transistor 78. The occurrence of a CH bit is manifested by a grounded condition on lead 80 and a CV bit is manifested by a grounded condition on lead 84. When neither the CH bit nor the CV bit is present the collectors of transistors 74 and 76 are at +12 volts and they do not conduct. The base of transistor 78 is also at +12 volts and it will conduct upon the occurrence of a strobe bit on lead 120. As will be later explained, the strobe bit on lead 120 is a grounded condition that occurs when a key on keyboard 10 is depressed. Thus, if no CH or CV bit is present when a key is depressed, transistor 78 will conduct and produce a C bit signal on C bit lead 38 from the collector of transistor 78.

If both the CH and CV bits are present, leads 80 and 84 are grounded, which connects the base of transistors 74 and 76 to ground and prevents conduction. The base of transistor 78 will be at +12 volts and when the strobe bit on lead 120 grounds the emitter, transistor 78 will conduct and a C parity bit signal is produced on lead 38.

If the CH bit is present when the CV bit is not, the base of transistor 76 will be grounded but the emitter thereof will not be grounded. Conduction will occur and the collector (and consequently the base of transistor 78) will be at ground level and transistor 78 will not conduct when the strobe bit occurs and no C parity bit will be generated. Likewise, if a CV bit is present and a CH bit is not, transistor 74 will conduct and the base of transistor 78 will be grounded and no C parity bit will be produced.

Referring to FIG. 4, the 8 bit, the A bit, and the B bit leads 24, 26 and 28 from encoding means 20, and the 1 bit, the 2 bit, and the 4 bit leads 30, 32 and 34 from encoding means 22 are shown each connected through a resistor to the base of a separate one of transistor circuits 72–1, 72–2, 72–4, 72—8, 72–A and 72–B. The C lead 38 from the parity generator 36 is connected to the base of transistor circuit 72–C. Each of the transistors 72–1, 72–2, 72–4, 72–8, 72–A, 72–B and 72–C have their respective emitters connected to a potential source which, in the present example, is +12 volts. The operation of these transistors in cooperation with the encoding means 20 and 22 and the keys of the keyboard 10 can be understood by the discussion of what occurs when a single key is depressed. It was stated that when the W key to keyboard 10 was depressed, lead V–6 was connected to lead H–2.

Figure 5:
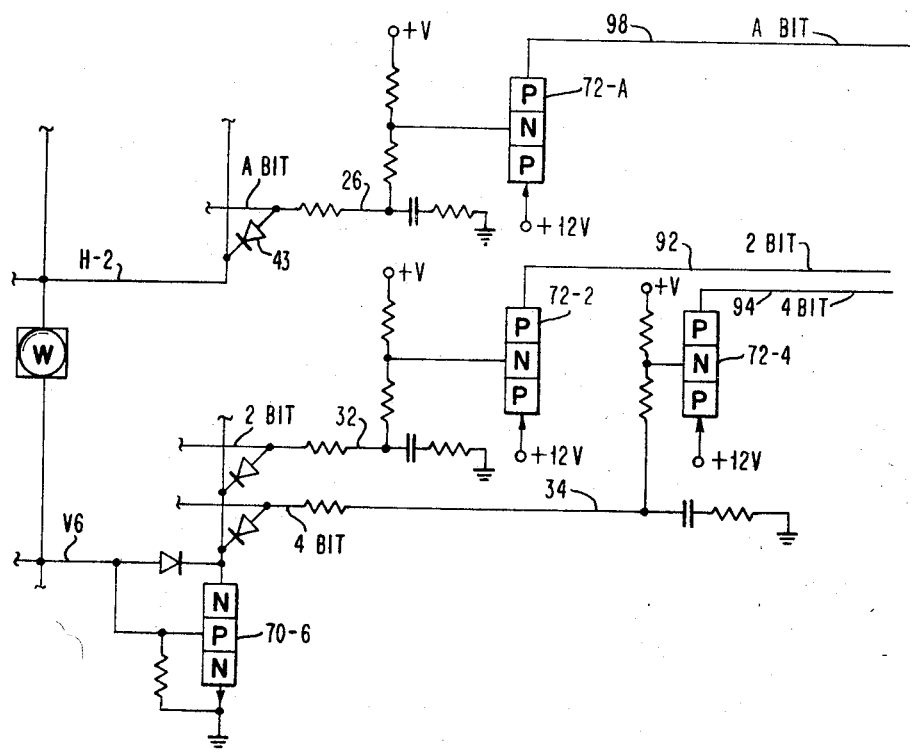
FIG. 5 illustrates a schematic diagram of portions of the system of FIG. 1 useful in explaining the operation thereof.

Referring to FIG. 5, the elements of FIGS. 2A and 2B, 3A and 3B, and 4 which operate when the W key is depressed have been redrawn as a partial schematic. In FIG. 5 the depression of the W key electrically connects leads H–2 and V–6. This causes current to flow from the 12 volt source associated with transistor 72–A. The current through transistor 72–A is connected through the A bit lead 26 and diode 43 to lead H–2, through the key contact W, through lead V–6, through the base emitter function of transistor 70–6 to ground. This in turn causes the 12 volt potential connected to the emitter of transistor 72–2 to supply current through the 2 bit line 32 through transistor 70–6 to ground and the 12 volt potential connected to the emitter of transistor 72–4 to supply current through the 4 bit line 34 through transistor 70–6 to ground. Current is therefore also provided to an A bit output line 98 connected to the collector of transistor 72–A, a 2 bit output line 92 connected to the collector of transistor 72–2, and a 4 bit ouput line 94 connected to the collector of transsitor 72–4. Thus, output currents are provided on the A bit, 2 bit and 4 bit output lines 98, 92 and 94, respectively, satisfying the BCD code for the character W (see Table I). An advantage gained by the circuit shown in FIG. 5 is that only relatively small currents pass through the contacts associated with key W. In like manner, it can be seen that the depression of any of the other keys of keyboard 10 will connect the two associated leads set forth in Table I wtih the result that one or more of the transistors 72–1, 72–2, 72–4, 72–8, 72–A and 72–B will be connected to ground through one of the transistors 70–0 through 70–7 and output currents will be generated on one or more output leads 90, 92, 94, 96, 98 and 100 associated with bits 1, 2, 4, 8, A and B in accordance with the BCD code for the character selected as set forth in Table I.

FIG. 5 clearly illustrates that two stage encoding is a feature of the present invention, that is, the H lines and the V lines are encoded separately. The encoding also utilizes a current combining feature wherein depressing the key (i.e., W in FIG. 5) creates a ground condition for the H leads and for the V leads, but the associated code leads 24, 26 and 28 associated with the H leads and the code leads 30, 32 and 34 associated with the V leads are grounded via separate circuit paths. In FIG. 5, the A bit lead 26 and the current from transistor 72–A is grounded via lead H–2 ,V–6 and transistor 70–6 whereas the 2 bit and 4 bit leads 32 and 34 are grounded and the currents from transistors 72–2 and 72–4 flow directly through the transistor 70–6.

Still another advantage of the present embodiment is that the current combining feature of the present invention is also extended to the parity generation function and the interlock function as well as the described encoding function. The parity generation function and the interlock function will be described in detail later in the discussion and the current combining scheme will be obvious.

In FIG. 4 the C bit lead 38 from transistor 78 is connected to the base of transistor 72–C. When the C bit is present, transistor 78 is conducting and the 12 volt potential connected to the emitter of transistor 72–C is connected through the C bit lead 38 through transistor 78 and lead 84 to ground thereby supplying current to the C bit output lead 102.

The strobe bit generator 42 of FIG. 1 is shown in FIG. 3B as diodes 110, 112, 114 and 116. The strobe generator 42 functions to produce a bit referred to as the strobe bit whenever a key of the keyboard 10 is depressed. The rear sides of the diodes 110, 112, 114 and 116 are connected to the strobe lead 120. The forward sides of the diodes 110, 112, 114 and 116 are connected, respectively, to the CV bit, 1 bit, 2 bit and 4 bit leads 84, 30, 32 and 34. Whenever a key is depressed, one or more of the leads 84, 30, 32 or 34 must be connected to ground, thus the strobe lead 120 is grounded in the event of a key depression. Note in FIG. 3B that the emitter of transistor 78 associated with the C parity bit is connected through diode 110. This means that the strobe bit must be present in order that the C parity bit be generated as was previously discussed. In FIG. 4 the strobe bit lead 120 is connected to the base of transistor 72–S which functions in the same manner as transistor 72–C, that is, in the presence of a strobe bit the potential on the emitter of transistor 72–S is connected through the base emitter function to ground and a signal appears on the strobe output lead 104.

The keyboard interlock circuit means 44 of FIG. 1 is designed to provide an output signal when two or more keys of the keyboard 10 have been simultaneously depressed. If two or more keys are simultaneously depressed, that means that two or more H leads may be connected to a V lead, or two or more V leads may be connected to an H lead, or two or more H leads may be connected to two or more V leads. This is an error condition and no output should be allowed. It was stated in the previous discussion that connecting the H and V leads corresponds to grounding the circuit. In FIGS. 3A and 3B the keyboard interlock circuit consists of two separate transistors. Transistor 130 associated with the H leads and transistor 132 associated with the V leads. Each of the H leads H–0 through H–7 is respectively connected through a separate one of resistors 134–1 through 134–8 to the base of transistor 130. Likewise each of the V leads V–0 through V–7 is respectively connected through a separate one of identical resistors 136–1 through 136–8 to the base of transistor 132. Transistor 130 is biased such that if a single one of the H–0 through H–7 leads are connected to ground, the connection through the single one of the resistors 134–1 through 134–8 operates as a voltage divider circuit, but the voltage at the base of transistor 130 is not sufficient to turn transistor 130 on. However, if two or more of the leads H–0 through H–7 are connected to ground, the associated ones of resistors 134–1 through 134–8 add in parallel to produce a lesser resistance value, the potential at the base of transistor 130 is higher and there is sufficient bias to turn transistor 130 on. Likewise if more than one of the V–0 through V–7 leads is connected, transistor 132 will turn on. Thus, any double key depression will turn on either transistor 130 or transistor 132 or possibly both. The output from the collector of transistor 130 and the output from the collector of transistor 132 are connected together on output lead 140. Thus, the keyboard interlock circuit 44 is essentially two separate two or more conditions for the H leads and the V leads which indicates when two or more of the H leads or two or more of the V leads are connected at the same time.

The output lead 140 for the keyboard interlock circuit 44 is connected to the interlock and sequence control means 46. The function of the interlock and sequence control means is to provide a keyboard lock signal in the event of a multiple key depression as indicated by a signal on line 140 or upon the reception of a keyboard restore signal which will now be described. It was discussed with reference to FIG. 4 that the ultimate result of depressing a key is the BCD code for that key being set up as signals on one or more of the output leads 90, 92, 94, 96, 98 and 100 and the possibility of a parity bit on lead 102 plus a strobe signal on lead 104 occurring during the key depression. The signals on these leads represent the useful output of the device in terms of BCD coding signals. It is anticipated that the present electronic keyboard device will be used in co-operation with a number of different types of receiving devices. It is also expected that on certain classes of the receiving devices it would be desirable to provide a return signal therefrom which indicates to the keyboard device that the character has been received and that no further characters should be transmitted until the signal from the receiving device ceases. For example, if the receiving device is a computer having an input buffer storage, the keyboard restore signal indicates that the character has been received in the buffer storage and no further character should be sent until the first character is transferred out of the buffer storage.

Figure 6:
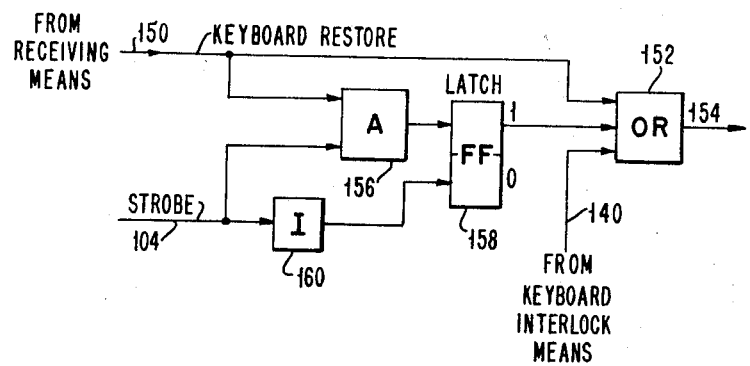
FIG. 6 illustrates a logical function diagram of a portion of the circuit of FIG. 3.

Referring to FIG. 6, a logical block diagram of the function performed by the interlock and sequence control means 46 is shown having three input leads, lead 150 which is the keyboard restore lead from the receiving means, the strobe lead 104, and the lead 140 from the interlock circuits. The output from the interlock and sequence control means 46 is lead 154 which is called the locking lead. A signal on lead 154 serves to inhibit the output from the keyboard device and will be later described. The first instance when it is desired to inhibit the keyboard output is when two or more keys have been depressed at the same time. This condition will be represented by a signal on lead 140 from the keyboard interlock circuits which is applied directly through OR circuit 152 to provide a signal on locking lead 154. The keyboard restore lead 150 is also connected through OR circuit 152 to provide a signal on locking lead 154 to indicate that no character should be produced while the signal from the receiving means is still present. Because of the high speed nature of the present device it is possible that the keyboard restore signal on lead 150 occurs when they key for the character being acknowledged is still being depressed. In this instance the strobe signal will be present on lead 104. It is also possible that the keyboard restore signal on lead 150 ceases before the strobe signal on lead 104 and in such case it would not be desirable to unlock the keyboard until the end of the strobe signal. To accomplish this the keyboard restore lead 150 and the strobe lead 104 are applied to an AND circuit 156, the output of which sets latch 158 causing a latching signal to be applied to OR circuit 152 and to produce a signal on locking lead 154. Thus, if the keyboard restore signal were to cease, the latch 158 would still cause a signal to be produced on locking lead 154. At the end of the strobe pulse, however, it is desired to unlock the keyboard and the trailing edge of the strobe pulse is inverted by inverter 160 applying a positive signal to the reset side of latch 158 and the output signal on locking lead 154 ceases. The logical block diagram of FIG. 6 is incorporated in the circuit diagram of FIG. 3B by the transistor network including transistor 162, transistor 164, transistor 166, transistor 168, transistor 170 and transistor 172. The keyboard restore lead 150, the lead 140 from the keyboard interlock circuits and the control leads 120 are shown connected to this resistor network. The circuit operates in the same functional fashion as was more clearly shown in FIG. 6 and a particular description of the transistor operations will not be provided.

The locking lead 154 is also shown in FIG. 3B. The locking lead 154 is connected to the leads 30, 32, 34, 24, 26, 28, 38 and 120 of FIG. 4 via separate diodes 180–1 through 180–8. The signal on the locking lead 164 provides a bias or inhibit signal to prevent the operation of the associated transistors 72–1 through 72–S and thereby prevents the occurrence of any output signals on leads 90, 92, 94, 96, 98, 100, 102 and 104. In this sense the keyboard locking function is an electrical inhibit function rather than a mechanical locking function because no physical locking of the keyboard occurs. The locking function produced by the keyboard restore signal can be omitted, as will be the case when using the keyboard with receiving devices that do not provide an answer back or keyboard restore type signal.

What has been described is a complete keyboard terminal in which all functions are performed electronically. The electronic keyboard employs solid state logic technology and can therefore be made compact, will have increased reliability and will be simple to maintain. The keyboard unit of the terminal is an elastomeric diaphragm switch which is not subject to mechanical wear and which may be sealed so it is not subject to the problems caused by dampness or other environmental conditions. The keyboard terminal is also capable of high speed operation having a speed of response in the order of one character every one hundred microseconds and may be used as a transmitter, a computer input terminal or the like. The embodiment shown in the drawings produced the BCD code, however, the invention is not limited to the generation of any one particular code.

While the invention has been particularly shown and described with reference to a preferred embodiment thereof, it will be understood by those skilled in the art that various changes in form and details may be made therein without departing from the spirit and scope of the invention.

What is claimed is:

1. A keyboard terminal comprising a keyboard unit for selectively connecting at least one lead from a first plurality of leads to at least one lead from a second plurality of leads,
   and encoding means connected to said first and second plurality of leads for producing coded output signals representative of the given leads connected by said keyboard unit,
   wherein said encoding means includes a first encoder connected to said first plurality of leads from said keyboard unit and a second encoder connected to said second plurality of keys from said keyboard unit,
   said first encoder including output leads and means for producing coded output signals on at least one of said output leads representative of said single given lead from said first plurality of leads connected by said keyboard unit,
   said second encoder including output leads and means for producing coded output signals on at least one of said output leads representative of said single given from said second plurality of leads connected by said keyboard unit,
   further including first parity means connected to said first encoder for producing a parity signal when coded signals appear on an even number of said output leads of said first encoder,
   and second parity means connected to said second encoder for producing a parity signal when coded signals appear on an even number of said output leads of said second encoder,
   and third parity means connected to said first and second parity means for producing a parity signal when parity signals are simultaneously produced by both said first and second parity means and when no parity signals are produced by said first and second parity means,
   said third parity means producing no parity signal when only one of said first and second parity means produces a parity signal.

2. A keyboard terminal comprising a keyboard unit for selectively connecting at least one lead from a first plurality of leads to at least one lead from a second plurality of leads,
    and encoding means connected to said first and second plurality of leads for producing coded output signals representative of the given leads connected by said keyboard unit,
    wherein said encoding means includes a first encoder connected to said first plurality of leads from said keyboard unit and a second encoder connected to said second plurality of keys from said keyboard unit,
    said first encoder including output leads and means for producing coded output signals on at least one of said output leads representative of said single given lead from said first plurality of leads connected by said keyboard unit,
    said second encoder including output leads and means for producing coded output signals on at least one of said output leads representative of said single given lead from said second plurality of leads connected by said keyboard unit,
    further including a first interlock means connected to said first plurality of leads for producing a first interlock signal when at least two of said first plurality of leads are connected by said keyboard means to at least one of said second plurality of leads,
    a second interlock means connected to said second plurality of leads for producing a second interlock signal when at least two of said second plurality of leads are connected by said keyboard means to at least one of said first plurality of leads,
    and a third interlock means connected to said first and said second interlock means to produce an inhibit signal upon the occurrence of at least one of said first and second interlock signals,
    and means connecting said third interlock means to said output leads of said first and second encoder to inhibit said coded output signals therefrom upon the occurrence of said inhibit signal.

3. A keyboard terminal comprising a keyboard unit for selectively connecting at least one lead from a first plurality of leads to at least one lead from a second plurality of leads,
    and encoding means connected to said first and second plurality of leads for producing coded output signals representative of the given leads connected by said keyboard unit,
    wherein said encoding means includes a first encoder connected to said first plurality of leads from said keyboard unit and a second encoder connected to said second plurality of keys from said keyboard unit,
    said first encoder including output leads and means for producing coded output signals on at least one of said output leads representative of said single given lead from said first plurality of leads connected by said keyboard unit,
    said second encoder including output leads and means for producing coded output signals on at least one of said output leads representative of said single given lead from said second plurality of leads connected by said keyboard unit,
    further including a strobe means connected to said output leads from said second encoder for producing a strobe signal upon the occurrence of at least one of said coded output signals on said second encoder output leads,
    said strobe signal indicating at least one lead from said first plurality of leads being connected to at least one lead from said second plurality of leads.

4. A keyboard terminal comprising a keyboard unit for selectively connecting at least one lead from a first plurality of leads to at least one lead from a second plurality of leads,
    and encoding means connected to said first and second plurality of leads for producing coded output signals representative of the given leads connected by said keyboard unit,
    wherein said encoding means includes a first encoder connected to said first plurality of leads from said keyboard unit and a second encoder connected to said second plurality of keys from said keyboard unit,
    said first encoder including output leads and means for producing coded output signals on at least one of said output leads representative of said single given lead from said first plurality of leads connected by said keyboard unit,
    said second encoder including output leads and means for producing coded output signals on at least one of said output leads representative of said single given lead from said second plurality of leads connected by said keyboard unit,
    wherein said output leads of said first encoder are selectively connected to a ground potential present on said single given lead from said first plurality of leads connected by said keyboard unit,
    wherein said output leads of said second encoder are selectively connected to a ground potential present on said single given lead from said second plurality of leads connected by said keyboard unit,
    and wherein said ground connections of said output leads from said first encoder and said ground connections of said output leads from said second encoder are made by electrically independent paths.

5. A keyboard terminal according to claim 4 further including a first interlock means connected to said first plurality of leads for producing a first ground potential interlock signal when at least one lead in addition to said single given lead of said first plurality of leads is connected by said keyboard means to said ground potential present on said single given lead from said second plurality of leads,
    a second interlock means connected to said second plurality of leads for producing a second ground potential interlock signal when at least one lead in addition to said single given lead of said second plurality of leads are connected by said keyboard means to said ground potential present on said single given lead from said first plurality of leads,
    and a third interlock means connected to said first and second interlock means to produce an inhibit signal upon the occurrence of at least one of said first and second ground potential interlock signals,
    and means connecting said third interlock means to said output leads of said first and second encoder to inhibit said coded output signals therefrom upon the occurrence of said inhibit signal.

6. A keyboard terminal according to claim 4 further including a strobe means connected to said output leads from said second encoder for producing a strobe signal when said output leads of said second encoder are selectively connected to said ground condition present on said single given lead from said second plurality of leads connected by said keyboard unit,
    said strobe signal being a ground potential signal indicating at least one lead from said first plurality of leads being connected to at least one lead from said second plurality of leads.

7. A keyboard terminal according to claim 6 further including first parity means connected to given output leads of said first encoder for producing a parity signal when said given output leads of said first encoder are selectively connected to said ground potential present on said single given lead of said first plurality of leads connected by said keyboard unit,
    and second parity means connected to given output leads of said second encoder for producing a parity signal when said given output leads of said second encoder are selectively connected to said ground potential present on said single given lead of said second plurality of leads connected by said keyboard unit, and third parity means connected to said first and second parity means and said strobe means for producing a parity signal when parity signals are simultaneously produced by both said first and second parity means and when no parity signals are produced by said first and second parity means during the occurrence of said strobe signal, said third parity means producing no parity signal when only one of said first and second parity means produces a parity signal during the occurrence of said strobe signal.

8. A keyboard terminal comprising a keyboard unit, a first plurality of electrical conductors each connected to a potential source of electric potential, a second plurality of electrical conductors each connected to an electric ground, said keyboard unit including a plurality of depressable keys, each of said keys connected to a given one of said first plurality of conductors and to a given one of said second plurality of conductors for electrically contacting said given conductors together when said key is depressed, said key connections arranged such that each key is connected to a discrete pair of said given conductors so that each pair of contacted conductors is definitive of said depressed key producing said contact, a first encoder including three code leads, each of said three code leads connected to at least one of said first plurality of conductors, said three code leads being respectively representative of that 8 bit, the A bit and the B bit of the BCD code, a second encoder including three code leads, each of said three code leads connected to at least one of said second plurality of conductors, said three code leads being respectively representative of the 1 bit, the 2 bit and the 4 bit of the BCD code, said first encoder producing output signals on said code leads thereof representative of the given one of said first plurality of conductors being contacted, said second encoder producing output signals on said code leads thereof representative of the given one of said second plurality of conductors being contacted, said signals of said output leads from said first and second encoders representing the BCD code bits associated with said depresed key electrically contacting said given conductors of said first and second plurality, strobe means connected to said second encoder for producing a strobe signal when any of said keys of said keyboard unit are depressed, a first parity means included in said first encoder and connected to selected ones of said first plurality of conductors for producing a first parity signal when an output signal is present on zero or two of said code leads thereof, a second parity means included in said second encoder and connected to selected ones of said second plurality of conductors for producing a second parity signal when an output signal is present on zero or two of said code leads thereof, a third parity means connected to said first and second parity means and said strobe means for producing a third parity signal upon the occurrence of both said first and second parity signals and said strobe signal and upon the occurrence of neither of said first and second parity signals and the presence of said strobe signal, and an interlock means connected to said first and second plurality of conductors and having an output lead connected to the code leads of said first and second encoders and to said third parity means for producing an inhibit signal to inhibit the signals on said code leads from said first and second encoders and from said third parity means upon the occurrence of at least two pairs of said first and second plurality of conductors being contacted as a result of at least two of said keys of said keyboard unit being depressed simultaneously.

References Cited

UNITED STATES PATENTS

| | | | |
|---|---|---|---|
| 3,021,063 | 2/1962 | Von Kummer | 340—146.1 X |
| 3,117,219 | 1/1964 | Merfeld | 235—153 |
| 3,281,829 | 10/1966 | Baumgartner | 340—347 |

FOREIGN PATENTS 18,919  10/1953  Japan.

MALCOLM A. MORRISON, Primary Examiner

R. S. DILDINE, Jr., Assistant Examiner

U.S. Cl. X.R.

178—23; 235—153; 340—347

PO-1050
(5/69)

UNITED STATES PATENT OFFICE
CERTIFICATE OF CORRECTION

Patent No. 3,493,928　　　　　　　　Dated February 3, 1970

Inventor(s) Hans Y. Juliusburger

It is certified that error appears in the above-identified patent and that said Letters Patent are hereby corrected as shown below:

Col. 10, line 53　　After "given", insert --lead--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents